United States Patent [19]
Bader et al.

[11] 4,301,581
[45] Nov. 24, 1981

[54] METHOD AND APPARATUS FOR THE PRODUCTION OF TURNED WORKPIECES ON MULTI-STATION MACHINE TOOLS

[75] Inventors: Eugen Bader, Saline 14, 7210 Rottweil, Fed. Rep. of Germany; Kurt Jauch, Bempflingen, Fed. Rep. of Germany

[73] Assignee: Eugen Bader, Rottweil, Fed. Rep. of Germany

[21] Appl. No.: 63,162

[22] Filed: Aug. 3, 1979

Related U.S. Application Data

[63] Continuation of Ser. No. 821,409, Aug. 3, 1977, abandoned.

[30] Foreign Application Priority Data

Sep. 23, 1976 [DE] Fed. Rep. of Germany ....... 2642719

[51] Int. Cl.³ ...................... B23P 17/00; B23P 23/00; B23Q 41/00
[52] U.S. Cl. ..................................... 29/38 C; 29/417; 29/564
[58] Field of Search .................. 29/37 R, 38 A, 38 C, 29/412, 417, 558, 563, 564

[56] References Cited

U.S. PATENT DOCUMENTS

| | | | |
|---|---|---|---|
| 2,429,938 | 10/1947 | Mansfield | 29/38 C |
| 3,372,449 | 3/1968 | Jamison | 29/37 R |
| 3,596,545 | 8/1971 | Eisenhardt | 82/2.5 |
| 3,895,424 | 7/1975 | Hautau | 29/38 C |

Primary Examiner—Ervin M. Combs
Attorney, Agent, or Firm—Michael J. Striker

[57] ABSTRACT

The method and apparatus relates to the production of turned workpieces on multi-station machine tools. In such machines rod stock is introduced into a clamping device (collet chuck) of the machine and is clamped thereby. A rod section is severed at a distance from the clamping device and the free end protruding from the clamping device is turned. In such a process a section from the rod stock is introduced into the clamping device, clamped fast there and severed, which section comprises a multiple of the machining length and in addition a clamping section sufficing for the clamping of one single machining length section. This multiple section is moved by sections corresponding in each case to the machining length section out of the clamping device. The rod stock is clamped fast during turning over a following machining length section in each case, the last machining length section being clamped fast by means of the provided additional clamping section. The machined workpiece is sawn from the clamped-fast residue of the multiple section in each case.

7 Claims, 18 Drawing Figures

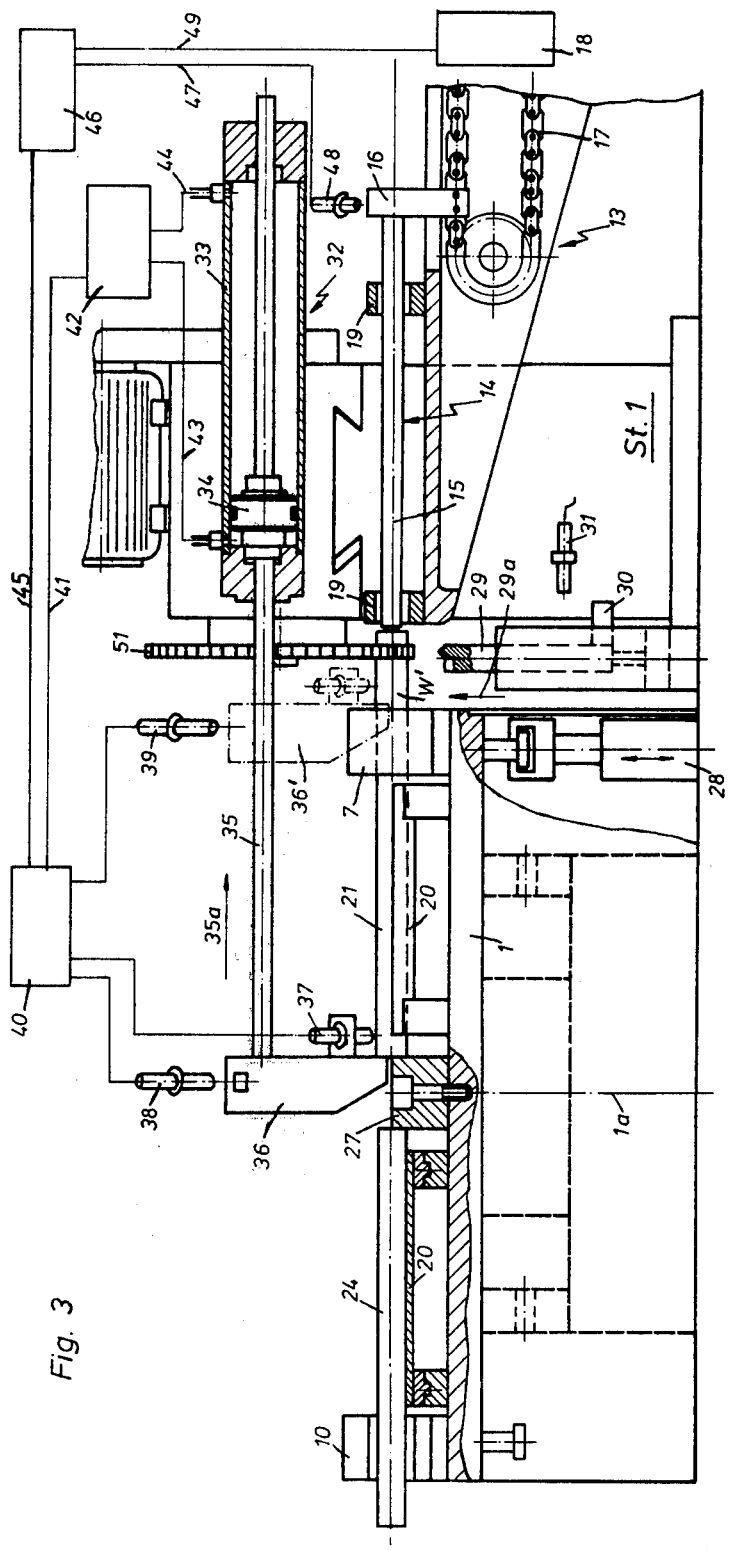
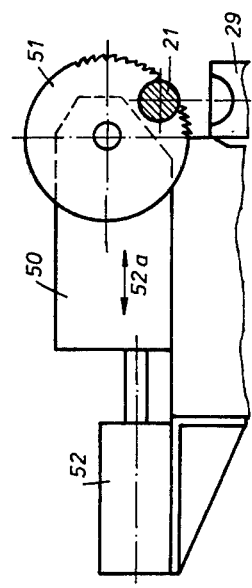
Fig. 3
Fig. 4

St. 1

St. 4

St. 2

St. 5

St. 3

St. 6

METHOD AND APPARATUS FOR THE PRODUCTION OF TURNED WORKPIECES ON MULTI-STATION MACHINE TOOLS

This is a continuation, of application Ser. No. 821,409, filed Aug. 3, 1977, abandoned.

BACKGROUND TO THE INVENTION

The invention relates to a method for the production of workpieces turned on the peripheral surface on multi-station machine tools, wherein:

rod stock is introduced into a clamping device of the machine tool, is clamped fast there, a rod section is cut off at a distance from the clamping device, the free end protruding from the clamping device is turned.

The invention further relates to a multi-station capstan machine for carrying out the method.

Such a method is carried out with the ordinary multi-station automatic capstan machines which are ordinarily provided with:

a turret or turntable which is stepwise indexable, a plurality of clamping devices, mounted at circumferential intervals on the turntable, for clamping rod stock from which the turned workpieces are to be produced, a charging or loading station and a plurality of working stations distributed in the peripheral direction, to which the rod stock clamped fast in the clamping devices can be fed in working sequence by the movement of the turret, and a cutter device associated with the loading station for the rod stock.

On such automatic machines a rod section is cut off and clamped fast in the clamping device, the length of which section corresponds to the length of the desired workpiece. The clamping devices as a rule are firmly connected with the turret so that as a rule work is carried out on automatic machines with the workpiece stationary and turning tools in rotation. Ordinarily the turret is arranged horizontally and the clamping devices are directed radially so that there is sufficient space for the arrangement of the machining units around the turret. However machines are also known (Ger.Pub.Spl No. 21 02 150) where the turret can move about a horizontal axis of rotation and the clamping devices are oriented axially in relation to this axis of rotation.

One essential advantage of the method for the production of turned parts on turret machines consists in that according to choice it is possible to work rod stock or so-called ring stock (rolled-up rod or wire material) as starting material.

It is disadvantageous that on the known machines turning work on workpieces is possible only on the parts which protrude from the clamping device. At the clamped portion no turning work can be executed. Thus the production of workpieces on such machines is limited as a rule to those parts where the whole peripheral surface does not have to be worked, that is to those parts where there is still a sufficiently large zone left free for clamping. In order to overcome this disadvantage, machines have been constructed in small numbers where the workpiece is firstly turned from one side, then taken out of the clamping device and clamped afresh in a new clamp adapted to the turned diameter, and turned further. This method has the disadvantage that considerable extra expense is necessary for the clamping devices and the workpiece reversing device. Moreover a station is occupied for reversing which otherwise could be used for machining. Furthermore it is disadvantageous that the central axis of the first clamp is practically always offset in relation to the central axis of the second clamp. Moreover with this method the workpieces must often be clamped by such small surfaces that there is danger of the material being distorted by compression at the clamped surface, especially if heavy material-removal takes place in the second clamped position. This leads to corresponding waste.

Workpieces which are to be turned over the whole circumference in one clamped position can hitherto be produced only on single-spindle and multi-spindle automatic rod machines. As known, these work with rotating workpiece. The rod stock is loaded into the spindle drum and advanced by sections through the clamping device in each case, especially a pair of clamping jaws, of the spindle drum so far that it protrudes with its free end by at least one feed length, corresponding to the workpiece length plus the width of a severing tool, from the clamping device. At this free end the clamped-fast rod stock is machined to the desired workpiece shape. The feed of the rod stock is carried out in various ways. In some cases the material rod is grasped on the peripheral surface at the rear end by a retaining gripper and pushed by sections through the clamping jaws, the ejection of the remainder piece taking place to the rear through the retaining gripper. Otherwise a feed gripper is arranged before the clamping gripper of the spindle drum. The material rod is pushed with a push rod through this feed gripper and the clamping gripper, and the feed gripper takes over the further feed movement of the rod by sections. The rod remainder is expelled forward, namely by the next succeeding new material rod. In the case of both types of construction the finished workpiece is cut from the material rod by means of a cutting tool. In the case of the single spindle automatic machine only one workpiece is produced during each machine cycle, the tools come into action in succession. In automatic multi-spindle machines several tools on several spindles are in action at the same time, which is economical in the case of high production figures.

However the single and multi-spindle automatic machines have the following disadvantages in comparison with the automatic turret machines:

expensive spindle halting if operations other than turning are to be executed, for example milling, transverse drilling, transverse thread cutting, riveting, crimping, fitting. These operations can be carried out only with the spindle stationary;

expensive equipment, if work has to be carried out on the workpiece in several longitudinal axes, that is eccentrically of the axis of rotation;

noise nuisance resulting from rotation especially of long material rods of large diameter in their guides;

In the case of automatic multi-spindle machines, very expensive rod-loading devices, if these work fully automatically;

In the case of automatic multi-spindle machines with spindles aligned axially of the axis of rotation of the spindle drum, only a narrow tool space is available, so that tool changing and adjustment are correspondingly difficult.

The invention is based upon the problem of providing a method and an apparatus of the initially mentioned kind so that rod pieces turned on their entire peripheral surface can be produced on multi-station turret machines in one single clamping action. Thus the essential advantage of the automatic multi-spindle machines as regards turning possible over the whole length of the workpiece is to be achieved, but while retaining the essential advantages of the turret machines, namely the possibilities:

of carrying out the whole machining with the workpiece stationary, so that all the connected advantages such as simple execution of eccentric turning work, lower noise nuisance, simpler rod loading devices, are obtained, in the case of clamping devices aligned radially of the axis of rotation of the turret, of being able to arrange the machining stations more favourably in the radial direction, of being able to machine material rolled into rings.

SUMMARY OF THE INVENTION

In solution of this problem the initially stated method is characterised in accordance with the invention in that:

of the rod stock a section is introduced into the clamping device, clamped fast there and cut off from the remainder of the stock, which section has a length equal to a multiple of the machining length and additionally a clamping section sufficient for the clamping of a single machining length section, in that this multiple section is moved by sections out of the clamping device according to the machining length in each case and clamped fast during the turning by means of a following machining length section in each case, the final machining length section being clamped fast by means of the additional clamping section provided, and in that the machined workpiece is cut—preferably sawn—from the clamped-fast remainder of the multiple section in each case.

By "machining length" there is here understood the length of a workpiece produced in one clamping action plus the width of the severing tool. If in accordance with a known method several workpieces are produced in one clamp firstly in the form of one cohering piece which is finally cut up into individual pieces, within the meaning of the invention there is understood by "machining length" the length of these workpieces produced in one clamping action plus their cutting tool widths. By "rod stock" there is also understood so-called ring stock, which consists of rod or wire material rolled into ring form and ordinarily is formed into straight rod stock before introduction into the clamping device of the turret.

With the method in accordance with the invention all the advantages of the multi-spindle machine and the advantages of the turret machine are obtained, while the above-described disadvantages in each case are avoided. All turned parts which hitherto could be manufactured only on automatic multi-spindle machines can be produced on turret machines likewise by the method according to the invention. Furthermore by the use of this method further advantages are achieved which make the production of turned parts on turret machines still more attractive. These advantages are for example the possibility to provide a greater number of machining stations, without detriment to the accessibility of the tool space, that is to say the division of the operations can be made still more effective than in the case of the multi-spindle machine.

The possibility of using up material rods is here surprisingly great. While in the ordinary automatic single and multi-spindle machines the remainder piece must be at least of the length of the clamping zones of the clamping gripper and the retaining gripper of the rod loader or of the clamping gripper and feed gripper or the length of all three grippers, the remainder pieces according to the method in accordance with the invention are as a whole surprisingly small, since the remainder pieces of each multiple section needs to be only so long that it suffices for the clamping of one individual machining length section (the last). It is essential here that on automatic turret machines the severing of the stationary workpiece can take place with a saw blade which can be substantially thinner than the width of the cutting tool in the ordinary cutting of the rotating tool on automatic multi-spindle machines, for the cutting tool for reasons of strength cannot be made as narrow as a saw blade. According to the method in accordance with the invention a material rod having a total length for example of 3–4 m. is cut (according to the size and nature of the turret machine) for example into 5–20 pieces of approximately 200–800 mm. Firstly it is to be assumed that in the case of 5–20 pieces, of which one remainder piece is left over in each case, being necessary for the clamping of the last worked piece, as a whole a higher proportion of remainder pieces occurs than in the case of the single or multi-spindle automatic machine. That however is not so, for in the manner as explained for cutting away with a cutting tool more material is cut than in the case of cutting with a saw blade. As a rule the saw blade can be made about half as wide as the cutting tool. In the case of the tool width of 2 mm accordingly the saw blade can be 1 mm in width, that is if 15 workpieces are manufactured from a multiple rod section, then for the clamping of the last machine length 14 mm. are available as clamping length, without less parts being produced from this rod piece than in the case of manufacture of the same part on an automatic multi-spindle machine with cutting off by a cutting tool. It is here advantageous that according to the method in accordance with the invention the short remainder pieces are integral pieces, so that for example in the case of expensive non-ferrous metal a higher material re-sale price can be obtained than in the case of metal cut to shavings.

It is possible to introduce the rod stock—as in the multi-spindle machine—into the clamping device from the side opposite to the working side. In further development of the invention however the rod stock is pushed into the clamping device of the turret from the working side—radially inward in the case of clamping devices directed radially of the axis of the turret—and the cut-off multiple section is moved out of the clamping device by sections according to the respective machining length in the opposite direction—that is radially outward in the case of clamping devices directed radially of the axis of rotation of the turret.

A multi-station machine having the features as stated initially is characterised in accordance with the invention in that:

To each clamping device there is allocated on the side remote from the working side a guide for a rod stock section which comprises a multiple of the machining length and a clamping section sufficient for the clamping of one individual machining length section, in that preferably at the charging station a conveyor device is arranged by which this rod multiple section can be moved out of the clamping device by sections corresponding to the machining length in each case, and in that at the last machining station there is arranged a severing device—preferably a saw—by which the machined workpiece can be severed from the remainder of the rod multiple section clamped fast in the respective clamping device.

As conveyor device for the severed rod multiple section in each case there is expediently arranged a drive device which charges the end of the rod multiple section remote from the machining side. However as conveyor device for the severed rod multiple section in each case there can also advantageously be arranged a gripper device which grasps the rod multiple section at the end facing the working side. A feed gripper and/or a retaining gripper grasping the peripheral surface at the rear end of the rod are not necessary. In principle suitable drive devices or gripper devices, the use of which is proposed according to the invention, are known in other machines.

Further details and advantages of the invention appear from the following description of examples of embodiment as represented diagrammatically in the drawing, and from the Claims.

BRIEF DESCRIPTION OF THE DRAWING

FIG. 3 shows a lateral elevation, partially in section along the line III—III in FIG. 1, FIG. 4 shows a vertical partial section along the line IV—IV in FIG. 1.

DESCRIPTION OF PREFERRED EMBODIMENTS

Figure 1:
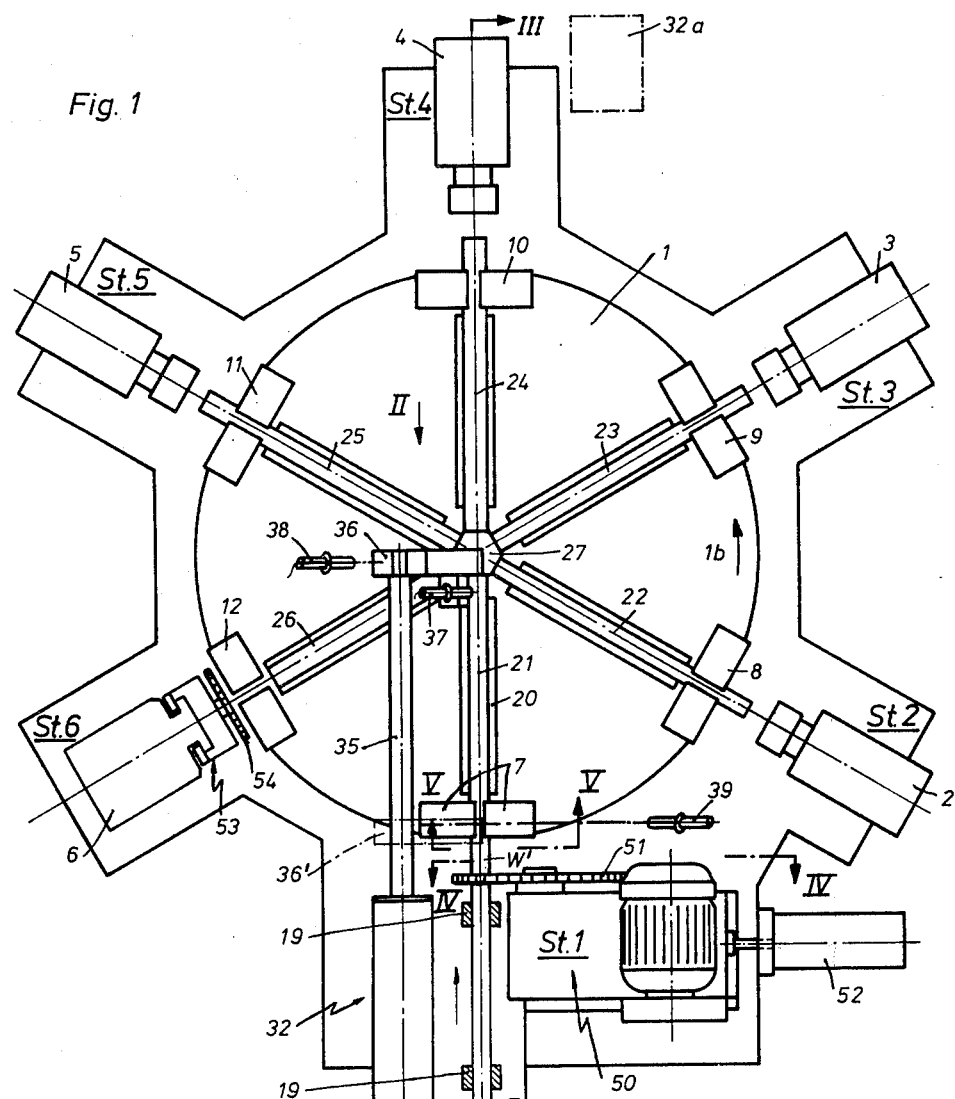
FIG. 1 shows a plan view of an automatic turret machine according to the invention.

The automatic machine as illustrated has a turret 1 stepwise indexable about a vertical rotation axis 1a, around which there are arranged uniformly spaced from each other in the circumferential direction a charging station St1 and a plurality of machining stations St2-St6 each with machining or working unit 2-6 such as for instance disclosed in the U.S. Pat. Nos. 3,895,424 and 3,596,545 for machining workpieces as shown in FIGS. 5A-5F. According to the number of the stations the turret 1 has six clamping devices 7-12 distributed uniformly in the circumferential direction for rod stock from which the workpieces are to be produced. The rod stock clamped fast in the respective clamping device 7-12 is fed in sequence to the individual stations St1-St6 by the turret movement.

At the charging station St1 a rod loader 13 is arranged which conveys the rod stock W into the respective clamping devices 7-12 of the turret 1. This loader has a drive device 14 with plunger 15 which presses upon the rear end of the respective rod W. Through a lug 16 the plunger 15 is connected with a drive chain 17 the drive 18 of which is merely diagrammatically indicated. The rod loader has guides 19 for the rod stock W.

With each clamping device 7-12 on the side remote from the machining units 2-6 there is associated a radially extending guide 20 in the form of a semi circular channel of such length that it is suitable as guide for a rod material section 21-26 comprising a multiple of the machining length and a clamping section sufficing for the clamping of an individual machining length section. The guides 20 extend radially of the rotation axis 1a and end close to this axis. On this rotation axis there is arranged a replaceable stop piece 27 common to all the guides. Beneath the turret 1 at the charging station St1 there is an apparatus 28 for actuating the respective clamping device 7-12 in known manner. The apparatus 28 may, for instance, include a fluid operated cylinder unit having a vertically displaceable piston rod, the upper end of which engages a vertically movable shank, corresponding to shank 37 in FIG. 3 of U.S. Pat. No. 3,596,545. Such a shank is provided at each of the clamping devices 7-12 and respectively vertically aligned with the apparatus 28 after each indexing of the turret 1. The clamping devices are self-locking and open only if actuated by the apparatus 28. On the other hand, the apparatus 28 may include a cam and lever arrangement as disclosed by elements 39, 40 and 41 in U.S. Pat. No. 3,596,545.

Moreover at the charging station St1 there is a vertically raisable stop 29 which is actuated by a piston drive (schematically indicated at FIG. 1) and cooperates through a lug 30 projecting laterally from the stop 29 with a feeler 31. The feeler, as well as the other feelers mentioned, may be an electric eye or a limit switch, to create when the lug 30 is aligned with the feeler an electric impulse.

At the charging station St1 there is further arranged a conveyor device 32 by which the rod section 21-26 can be moved by sections corresponding to the machining length in each case out of the respective clamping device 7-12. This conveyor device 32 is a drive device having a cylinder 33, a piston 34 axially movable therein with piston rod 35 on the outer end of which there is a drive lug 36 which acts upon the rod multiple section 21-26 at the end face remote from the machining side, that is radially from the interior outwards. On the lug 36 there is seated a feeler 37 which together with two further feelers 38, 39 controls the movements of the conveyor device 32 in the manner described below. For this purpose the feelers 37, 38, 39 which are preferably in the form of elastic eyes or photo-electric cells of well known construction are connected by electrical conductors a control device 40 which, on the one hand, is in control connection 41 with a compressed air source 42 connected through conduits 43 and 44 with the cylinder 33 of the conveyor device 32, and, on the other hand, is in control connection 45 with a control device 46, which, on the one hand, is connected through a lead 47 with a feeler 48 preferably also in form of an elastic eye cooperating with the lug 16 of the drive device 14 of the rod loader 13 and, on the other hand controls the drive 18 of the rod loader 13 through a lead 49.

Furthermore at the charging station St1 there is arranged a saw 50 with saw blade 51. This saw 50 is movable transversely of the rod stock W in the direction of the arrow 52a (FIG. 4) by a cylinder/piston drive system 52.

At the last machining station St6 a second severing device 53 with a saw blade 54 is arranged by which the machined workpiece can be severed from the remainder of the rod multiple section 21-26 in each case clamped fast in the respective clamping device.

Figure 5A:
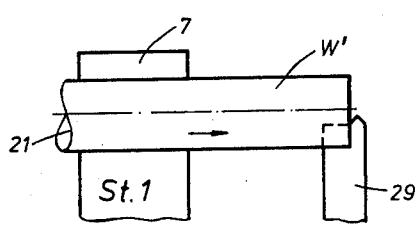
FIG. 5 shows a vertical partial section along the line V—V in FIG. 1, FIGS. 5a-f show in diagrammatic representation the working operations at the various stations, namely in lateral elevation in the direction of the arrows Va-f in FIG. 5.
Figure 5D:
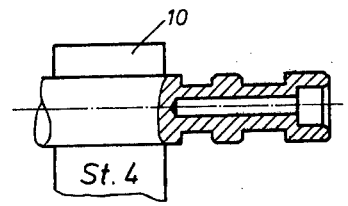
Figure 5B:
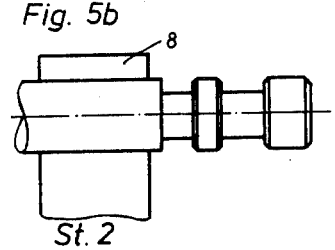
Figure 5E:
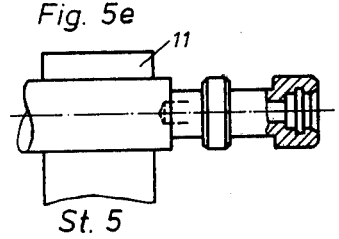
Figure 5C:
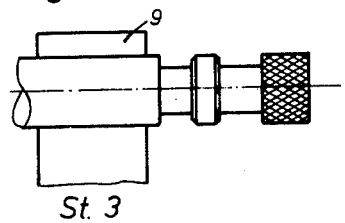
Figure 5F:
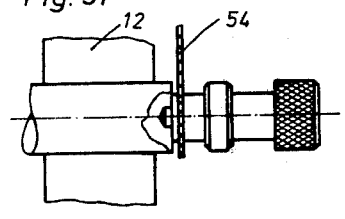
Figure 5:
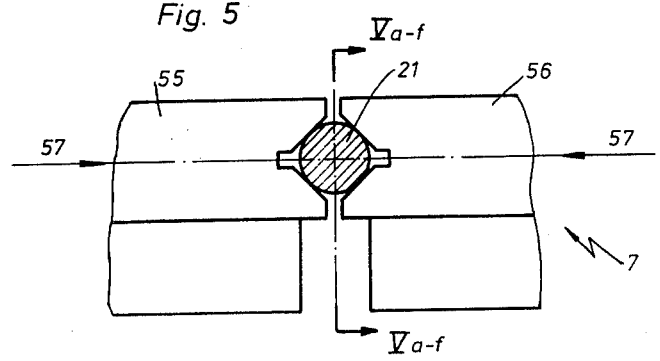

The clamping devices 7-12 clamp the respective rod sections 21-26 by means of two jaws 55, 56 (FIG. 5) which work centrally against one another in the direction of the arrow 57. The material W' protruding forwards out of the clamping device 7-12 corresponds to the workpiece length except for the width of the subsequent severing cut and a small safety length, and can be machined freely in stages at the stations St2-St6.

In departure from the known method on such machines, where at the station St1 the rod stock W is advanced by one workpiece length, clamped and severed, the method according to the invention works in a manner in which a longer part section 21 of the rod stock W is advanced at the charging station St1 almost to the center of the turntable, to the stop piece 27, and then clamped by the clamping device 7. From this rod stock piece 21, that is the piece cut off by the saw blade 51 from the rod stock W, as many workpieces can be produced as there are workpiece lengths plus severing tool width in the entire rod length of the piece 21—plus a remainder clamping piece. This remainder clamping piece is so long that it suffices for the clamping of the final machining length section.

The stop piece 27 is exchangeable and dimensioned so that the remainder clamping piece becomes smaller than one machining length section, so that after the finishing of the last complete workpiece on renewed advance by the lug 36 it can drop down between the stop 27 and the clamping device 7. The stop piece 27 is changed according to the workpiece length.

To explain the operations it is assumed that the clamping devices 7, 8, 9, 10, 11 and 12 are empty. It is further assumed that the clamping devices 7-12 initially are located between two stations, that is to say the clamping device 8 for example between stations St2 and St3. The supply conduit 44 to the cylinder 33 of the conveyor device 32 is charged with pressure. The engaging lug 36 thus stands in the maximum extended position, close to the rotation axis 1a of the turret 1. On the starting of the machine the turret 1 completes the commenced partial rotation and is locked in the usual way. Such turntables which can be automatically indexed and be locked in any position are for instance produced in series by Kingsbury Machine Tool Corporation in Keene, N.H. Directly after the locking the stop 29 is driven upwards in the direction of the arrow 29a either by operation of valves by the operator or by an automatic sequence control. In the upper position of the stop 29, in which its upper surface is just below the pad 15, the feeler 31 cooperating with the lug 30 gives as electrical control pulse to operate solenoid controlled valves for the opening of the clamping device 7, and pressure charging of the supply conduit 43 of the cylinder 33 from the source of compressed air 42. The lug 36 which is firmly connected with the piston rod 35 moves in the direction of the arrow 35a towards its retracted position 36' shown in dot-and-dash lines in FIG. 3. If the lug 36 can arrive at all in this position, this signifies that the clamping device 7 is empty, for the short remainder piece remaining in the clamp drops down between the clamping device 7 and the stop 29 on advance of the lug 36. Then a feed movement is initiated in the rod loader 13 through the feeler 39. The rod stock W is pushed through the guides 19 until it strikes upon the central stop piece 27. The lug 36 is in this case pushed again into its extended radially inner position by the rod stock at which the feeler 38 will issue an electric signal to the control switch 40 so that the conduits 43, 44 are rendered pressureless simultaneously with the loading operation of the rod loader 13, so that the piston 34 is not loaded at either side and the lug 36 can be entrained without resistance. After the lug 36 has reached the feeler, the latter gives an additional control pulse for a feed control, for example to the cylinder/piston drive system 52 of the saw 50, also to the stop 29 and further to the clamping device 7 which is just situated at the station St1. By this control impulse the clamping device 7 is closed and the stop 29 is driven back into the lower position represented in FIG. 3, so that the saw blade 51 can sever the rod stock W. After the severing operation and the return of the saw 50, the latter initiates a control pulse by engaging a limit switch not shown in the drawing for the further indexing of the turret 1 in the direction of the arrow 1b, so that the next clamping device can be loaded with rod stock W, so that all six clamping devices are loaded in sequence.

After the loading of the first part rod 21, sawing off and further indexing of the turntable 1, the first machining can be commenced at the station St2 with the unit 2. If one of the machinings on station St2-St6 lasts longer than the loading and sawing off, then further indexing is effected by an interlocking circuit of known construction only when the unit last having completed its machining likewise liberates the further indexing with a corresponding pulse. Thus both pulses must be present before a turntable step can take place. In order to avoid impacts, the piston 34 of the conveyor device 32 is provided with known damping means in its forward and rear positions.

The procedure was described above for absence of rod part pieces 21-26. If however a part piece is present, the lug 36 on its way from the radially inner position to the radially outer position 36' strikes the end of the rod part piece at some point and pushes the latter, with clamping device at station St1 opened, against the stop 29 situated in the upper position, so that at the following stations the rod zone W' advanced afresh can be machined. So that the lug 36 does not strike at full speed upon the rod part piece, the position of the latter is explored with the leading feeler 37 fastened to the lug 36 and connected in circuit with the control device 40. The control device 40 then reduces over a corresponding valve, not shown in the drawing, the return speed of the piston 34 so that the rod section W' is pressed lightly upon the stop 29 and can be clamped in the clamping device 7-12 by means of the clamping apparatus 28. During all these operations the guide channel 20 supports the respective rod part piece 21-26.

The feed control of the machining units 2, 3, 4, 5 and 6 is actuated in known manner after each indexing step, irrespective of whether a loading operation takes place simultaneously with the individual working operations or not. In order to prevent the feeler 38 from giving the pulse for clamping and sawing to the station St1 on every advance of the lug 36, the pulse is processed further only if a pulse from the feeler 39 has preceded.

The two cycles, in the one case machining with charging operation and in the other machining alone—can proceed at two completely different times. As a rule the charging operation and the sawing off of the material rod pieces will last longer than the machining, so that according to how many workpieces can be produced from a rod part piece, a larger number of short cycles can be followed by six longer cycles.

Since it is not guaranteed that the material rods fed by the rod loader are of equal length, it must be expected that on the one or the other occasion a shorter rod part piece will remain over. This would then in fact strike upon the central stop piece 27, but would no longer be grasped by the clamping device at station St1. In order to avoid this, in the position of the plunger 15 with lug 16 as illustrated in FIG. 3 a pulse is instigated by the feeler 48 which instantaneously stops the feed drive of the plunger 15 by means of the drive chain 17. The stop position of the plunger 15 is selected so that this residual rod stock W remains stationary about 3 mm. before the saw blade 51, so that only these 3 mm are severed.

In FIGS. 5a–f the production steps at the individual stations of the turntable are shown:

Station St1: Open clamping device 7, advance material W' in direction of arrow to stop 29;
Station St2: Machining of outer peripheral surface;
Station St3: Knurling;
Station St4: Drilling;
Station St5: Internal machining;
Station St6: Sawing off by means of the saw blade 54 of the severing device 53.

In the case of workpiece requiring a smaller number of machining operations, during indexing of the turntable through 360° two workpieces or even two or three different workpieces, if the material diameter is the same, can be produced at the same time. Only a second or third conveyor device 32, but without rod loader 13, is necessary, for example at the position 32a in FIG. 1. In the case of a 10-station machine for example three different workpieces can be produced as follows:

| Station 1: | Load | }first workpiece |
| --- | --- | --- |
| Station 2: | Shape | |
| Station 3: | Drill, saw off | |
| Station 4: | Re-clamp material | }second workpiece |
| Station 5: | Shape | |
| Station 6: | Cut thread | |
| Station 7: | Drill, saw off | |
| Station 8: | Re-clamp material | }third workpiece |
| Station 9: | Shape | |
| Station 10: | Saw off | |

Figure 2:
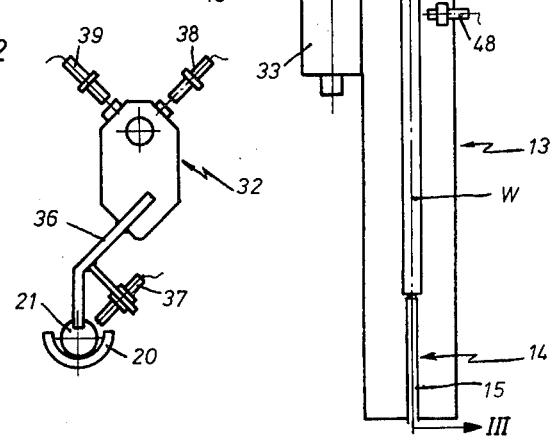
FIG. 2 shows a partial elevation in the direction of the arrow II in FIG. 1.
Figure 6:
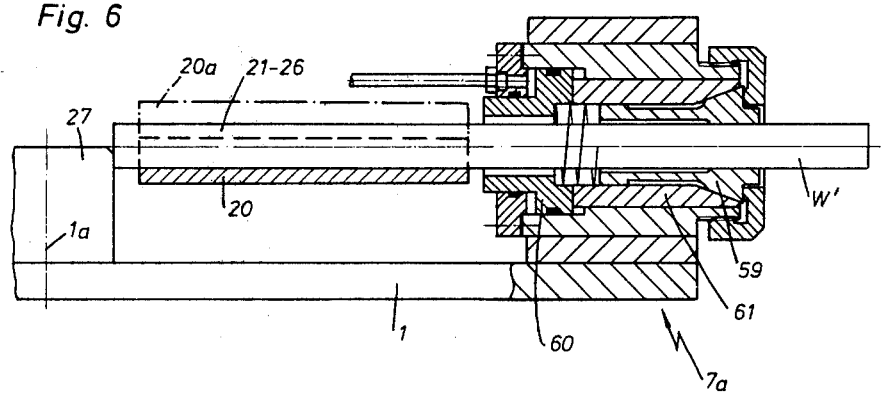
FIG. 6 shows a modified clamping device in vertical section analogous to the sectional plane according to FIG. 3.
Figure 8:
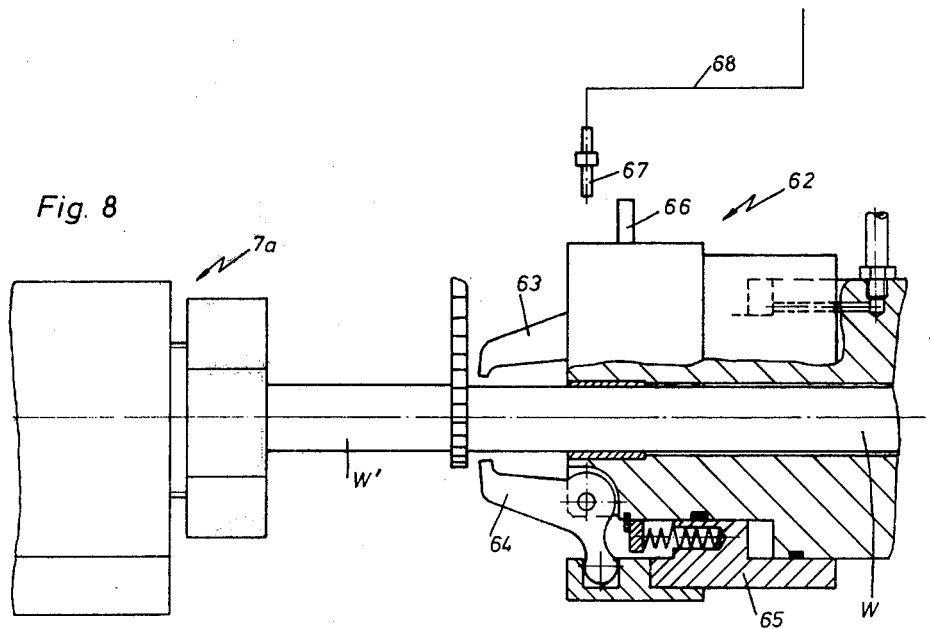
FIG. 8 shows the head of this conveyor device in enlarged representation, partially in section, together with adjoining parts of the machine.
Figure 7:
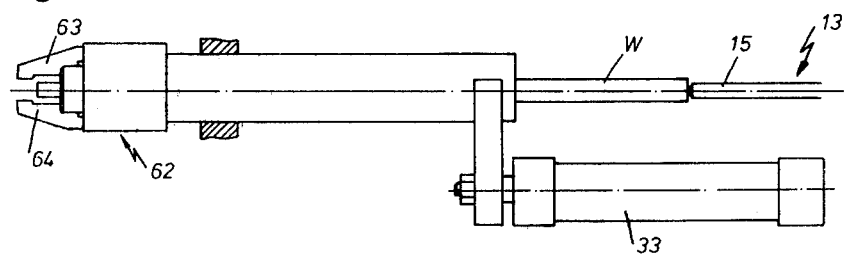
FIG. 7 shows a modified conveyor device for the rod multiple section.

In the modified embodiment according to FIG. 6 the respective clamping device 7–12 for the respective rod part piece 21–26 is formed as gripper clamping device 7a. Such a clamping device in each case has a gripper 59 which is clamped by means of a piston 60 and a thrust piece 61. In the case of this gripper clamping the material cannot be advanced from the rear with the lug 36 in the manner as shown in FIGS. 1–3, but must be drawn from the front out of the gripper 59 with the apparatus 62 as illustrated in FIGS. 7 and 8. The extraction takes place at the charging station St1. The finished workpiece is cut off by means of the saw blade 54 one station ahead of station St1. The gripping apparatus 62 makes an advancing movement towards the gripper at every cycle. The gripper fingers 63, 64 are closed over the piston 65 so that the rod residue protruding from the gripper 59 is grasped. By the rearward movement of the gripper 62 by one workpiece length plus severing tool width the material is entrained with the gripper opened. After clamping of the gripper and opening of the gripper fingers 63, 64 the turntable 1 can be further indexed. When the rod part piece is completely consumed and the remainder clamping piece has dropped away downwards, the gripper fingers 63, 64 at the next sequence can carry out a greater travel, so that a lug 66 connected with the piston will pass a feeler 67 whereby a control pulse is given to the rod loader 13 for the loading of a new rod part piece. For this purpose the feeler 67 is in control connection through a lead 68 with the drive 18 of the rod loader 13 (analogous with the control connection 48 in FIG. 3). In the embodiment according to FIGS. 6–8 a tube 20a instead of a semi circular channel can be used as guide 20 for the respective rod multiple section 21–26, as shown in dot-and-dash lines in FIG. 6.

At the charging station then the charging operation takes place analogously as described with reference to FIGS. 1–3: The rod stock W is pushed through the apparatus 62 forward into the gripper 59 until it strikes upon the central stop piece 27 of the turntable. Then the saw 50 is actuated by a control pulse, so that the material can be severed with the saw blade 51.

The surprisingly low loss of material in the carrying out of the method according to the invention appears from a comparison of the following examples, starting in each case from material rods having a total length of 4 m.:

(a) Material waste in the case of automatic single and multi-spindle machines, caused by loss in cutting and by the residual piece which can no longer be machined:

EXAMPLE 1

| | |
| --- | --- |
| Material diameter: | 14 mm |
| Workpiece length: | 20 mm |
| Cutting tool width: | 2 mm |
| Remainder piece using a loading magazine: | app. 80 mm (85 mm) |
| Number of workpieces | = (4000−85):(20 + 2) |
| | = 178 pieces |

EXAMPLE 2

| | |
| --- | --- |
| Material diameter: | 22 mm |
| Workpiece length: | 48 mm |
| Cutting tool width: | 3 mm |
| Remainder piece: | app. 80 mm (124) |
| Number of workpieces | = (4000−124):(48 + 3) |
| | = 76 pieces |

(b) Material waste in the method according to the invention, caused by loss in the sawing of a rod into part pieces and the subsequent sawing of workpieces from these part pieces:

EXAMPLE 1

| | |
| --- | --- |
| Number of rod part pieces | |
| Possibility A: | 16 part pieces @ 250 mm |
| Possibility B: | 16 part pieces @ 242 mm |
| | 1 remainder part piece 104 mm |
| | if 24 mm are deducted for |
| | 15 × 1.6 mm saw width |
| Number of workpieces | |

-continued

| Workpiece length: | 20 mm |
| --- | --- |
| Saw width: | 1 mm |
| | In the case of A: 250:21 = 11 pieces |
| | Remainder 18.9 mm |
| | In the case of B: 242:21 = 11 pieces |
| | Remainder 11 mm |

This remainder is sufficient for the clamping of the last part.

From the remainder part piece there can still be produced

104:21 = 4 pieces
Remainder 20 mm for clamping the last part.

Thus in all 16×11+4=180 workpieces can be produced. Thus despite division into rod part pieces, two workpieces more than in the case of the single or multispindle automatic machine.

With a workpiece length of about 10 mm, with the method according to the invention approximately 20 workpieces more can be produced from a rod 4 m in length than in the case of the known automatic lathes.

EXAMPLE 2

Number of rod part pieces with 265 mm length
4000:265 = 15 rod parts pieces
with a saw width of 1.6 mm.
Number of workpieces
265:(48+1.5) = 5 rod part pieces
Remainder for clamping the last workpiece = 17.5 mm.
Total producible workpieces
15×5 = 75 workpieces
That is in all 1 part less than the known method.

As regards the waste, it is possible to work according to the invention the more advantageously, the shorter are the workpieces to be.

Within the scope of the invention modifications are still possible by the application of technically equivalent means. It would be a more expensive and to that extent less favourable but nonetheless possible modification, to cut rod part pieces to length from workpiece rod stock completely separately from the capstan machine and only then to introduce them into the clamping devices of the capstan and clamp them fast. Moreover machines are possible in which the clamping device are not exactly radially directed, but directed for example secantially or even axially. Then the charging station and the individual machine stations are correspondingly differently arranged. In the case of thin rod stock, intersecting arrangements of guides 20 lying one above the other are possible, so that then the rod multiple sections 21–26 can be as long as corresponds to the diameter of the capstan and an additional machining length.

We claim:

1. A method for the production of machined workpieces from rod stock on multistation turret machines having at least one loading station and a plurality of subsequent working stations with a clamping device for each station on a turntable of the machine, and a machining unit coordinated with each of the working stations, said method comprising the steps of feeding a section of rod stock comprising a multiple of machining lengths plus a clamping section of a length sufficient for clamping a single machining length at the loading station into a clamping device at said loading station; clamping said section at the loading station; severing at the loading station the clamped section from the remainder of the rod stock at a distance from the clamping device corresponding to one machining length so that a length corresponding to a machining length protrudes beyond the clamping device at the loading station; indexing said turntable in successive steps through one revolution and machining the protruding section at said working stations, including severing the machined section at a working station; moving the remainder of said section at one station so that a length corresponding to a machining length protrudes beyond the clamping device at said one station; reclamping the remainder of said section at said one station; repeating said steps during further indexing of the turntable until only said clamping section remains in the clamping device at a working station; and finally moving said clamping section out of the clamping device at the respective station.

2. A method as defined in claim 1, wherein said step of feeding said section into said clamping device at said loading station comprises pushing said section in radially inward direction into said clamping device.

3. A method as defined in claim 2, wherein said step of moving the remainder of said section at said one station so that a length corresponding to a machining length protrudes again beyond the clamping device at said one station comprises the step of pushing the remainder of said section in radially outward direction beyond the clamping device at said one station.

4. A method as defined in claim 1, wherein the length of said section is substantially equal to the radius of the turntable.

5. A method as defined in claim 1, wherein the length of said section is at least five times the machining length plus said clamping section.

6. A method as defined in claim 1, wherein the severing step at said loading station and at a working station comprises cutting said section with a saw blade.

7. A multistation turret machine for the production of machined workpieces from rod stock, comprises a turntable having an axis and being indexable about this axis between a plurality of stations circumferentially displaced about said turntable and including a loading station and a plurality of working stations; a plurality of clamping devices mounted circumferentially spaced from each other on said turntable, one for each station, and respectively aligned therewith during each indexing of said turntable; means cooperating with the clamping device which during indexing of the turntable is at said loading station for opening and closing said clamping device; means for feeding rod stock into the clamping device at said loading station while the clamping device at said loading station is open; severing means at the loading station for severing a rod section from said rod stock, while the clamping device at said loading station is closed, so that a machining length protrudes radially outwardly from said clamping device at said loading station; a plurality of radially inwardly directed guide means on said turntable, one for each of said clamping devices, for guiding the severed rod section; a plurality of machining units respectively arranged at said work stations for machining the machining length protruding outwardly from the respective clamping device, said machining units including an additional severing device for severing a machined workpiece from said rod section, said additional severing device being located at a station preceding said loading station; and means at one of said stations following said station provided with said additional severing device for moving the remainder of said rod section in radially outward direction so that a further machining length protrudes again from the clamping device of said following station.

* * * * *